United States Patent [19]
Foladare et al.

[11] Patent Number: 6,026,306
[45] Date of Patent: Feb. 15, 2000

[54] LOCATION SENSITIVE MOBILITY TELECOMMUNICATIONS METHOD

[75] Inventors: Mark Jeffrey Foladare, Kendall Park; Shelley B. Goldman, East Brunswick; David Phillip Silverman, Somerville; Shaoqing Q. Wang; Robert S. Westrich, both of Middletown, all of N.J.

[73] Assignee: AT&T Corp., New York, N.Y.

[21] Appl. No.: 08/955,127

[22] Filed: Oct. 21, 1997

[51] Int. Cl.[7] .................................................. H04M 11/02
[52] U.S. Cl. ........................... 455/456; 455/445; 455/458
[58] Field of Search .................................. 455/456, 457, 455/458, 459, 461, 31.2, 445, 31.3; 379/201

[56] References Cited

U.S. PATENT DOCUMENTS

| | | | |
|---|---|---|---|
| 5,224,150 | 6/1993 | Neustein | 379/57 |
| 5,513,243 | 4/1996 | Kage | 455/456 |
| 5,610,970 | 3/1997 | Fuller et al. | 455/31.2 |
| 5,613,202 | 3/1997 | Ishida et al. | 455/457 |
| 5,644,626 | 7/1997 | Carlsen et al. | 455/459 |
| 5,666,662 | 9/1997 | Shibuya | 455/456 |
| 5,706,329 | 1/1998 | Foladare et al. | 455/459 |
| 5,740,539 | 4/1998 | Ishii | 455/456 |
| 5,768,356 | 6/1998 | McKentry et al. | 379/201 |
| 5,844,522 | 12/1998 | Sheffer et al. | 455/456 |

*Primary Examiner*—Edward F. Urban
*Assistant Examiner*—Thuan T. Nguyen
*Attorney, Agent, or Firm*—Oliff & Berridge, PLC

[57] ABSTRACT

A paging service decides whether a subscriber may be paged, or is busy and should not be paged, depending on the subscriber's location. The subscriber's location is either transmitted by his 2-way pager, or determined by determining the identity of the cell site used to relay the pager's signal. The status corresponding to a cell site may be fixed, or may vary with a schedule or subscriber preference information stored in a memory.

18 Claims, 6 Drawing Sheets

FIG. 1   LOCATION SENSITIVE MTS

INTELLIGENT MEETING ROOM

FIG. 6

| | 604 | 606 | 608 |
|---|---|---|---|
| 602 | TIME 1 TO TIME 2 | LOCATION | ACTION IF BUSY |
| | TIME 3 TO TIME 4 | LOCATION | ACTION IF BUSY |
| | ⋮ | ⋮ | ⋮ |

LOCATION SENSITIVE MOBILITY TELECOMMUNICATIONS METHOD

BACKGROUND OF THE INVENTION

1. Field of Invention

This invention relates to mobility telecommunication systems.

2. Description of Related Art

Currently, mobile telecommunication devices (e.g., pagers) alert a called party (subscriber) by an audible signal, for example. If the subscriber is in a situation where the audible signal is undesirable, such as during a meeting, the pager may be deactivated, or at least an audible signal generator of these devices may be deactivated. When the audible signal is again desired, i.e., when the meeting is over, the subscriber must remember to reactivate the pager to receive further pages. However, many times the subscriber forgets to reactivate the pager, resulting in missed calls. Thus, there is a need for a mobility telecommunication system that automatically determines when a subscriber alert such as an audible signal should be deactivated/activated.

SUMMARY OF THE INVENTION

A location-sensitive Mobility Telecommunication System (MTS) informs a portable communication device such as a cellular telephone or a pager that a subscriber is busy and does not wish to be disturbed. The subscriber's status (BUSY/NOT-BUSY) is automatically determined based on the location of the subscriber, without any subscriber action such as pushing a button or switching on his cellular telephone or pager.

Using pagers as an example, the location sensitive MTS includes at least one cell site and a Location-sensitive Mobility Telecommunication Device (LMTD). When a page request is received for the subscriber, the LMTD sends an inquiry signal to determine a location of the subscriber. The inquiry signal contains a subscriber identification (i.e., pager capcode) and is broadcast by the cell site. The pager receives the inquiry signal and responds without alerting the subscriber. When the pager responds, the cell site sends a site response including status and/or location information to the LMTD controller. The LMTD controller determines the status of the subscriber (i.e., BUSY or NOT-BUSY) based on the site response and responds to the page request (e.g., paging or not paging the subscriber) based on the status of the subscriber.

BRIEF DESCRIPTION OF THE DRAWINGS

The invention is described in detail with reference to the following drawings, wherein like numerals represent like elements, and wherein.

DETAILED DESCRIPTION OF PREFERRED EMBODIMENTS

Figure 1:
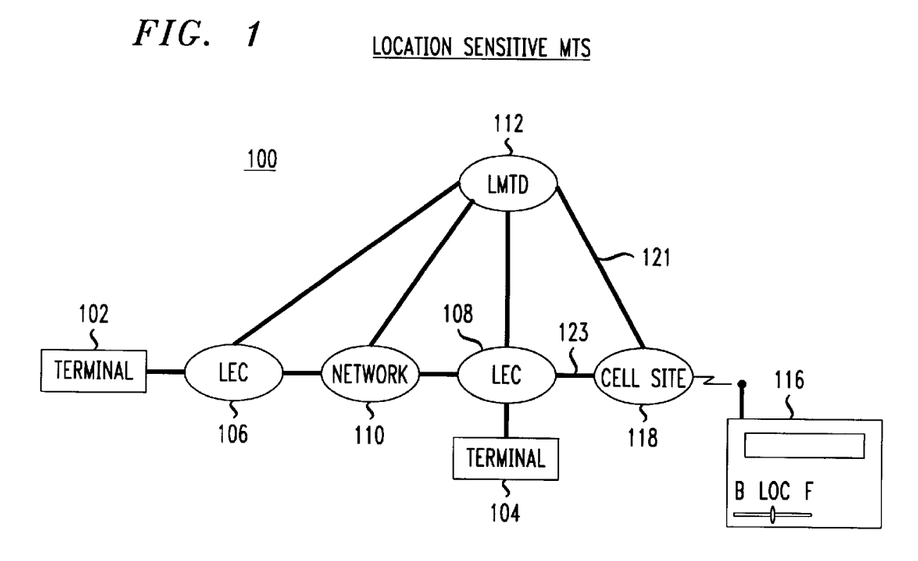
FIG. 1 shows a location-sensitive MTS.

An exemplary embodiment of a location-sensitive Mobility Telecommunications System (MTS) 100 is shown in FIG. 1. The location-sensitive MTS 100 includes telephone terminals 102 and 104, a telephone network 110, local exchange carriers (LEC) 106 and 108, a Location-sensitive Mobility Telecommunication Device (LMTD) 112, a pager 116 or other personal communication device such as a cellular telephone, and at least one cell site 118.

While the above description uses the telephone system as an example, the invention may be applied to other types of communication systems. For example, terminals such as personal computers may be coupled through modems and telephone lines via a data network such as the Internet coupled with the Location-sensitive Mobility Telecommunication Device (LMTD) 112. In addition, a combination of different networks may used. In the following description, the telephone system including the telephone terminals 102 and 104 connected to a telephone network 110 and coupled to a paging system (not shown) is used for ease of discussion.

The cell site 118 may be a transmit/receive unit such as a paging tower for wide area coverage, or a unit that services a single room. The cell site 118 may communicate with the LMTD 112 either through a direct connection 121 or through a network connection 123, or both. The location-sensitive MTS may contain a single cell site 118, but generally a number of geographically dispersed cell sites 118 will be used to communicate with the pager 116 at different locations.

The telephone terminals 102 and 104 are connected to the telephone network 110 through the LECs 106 and 108, respectively. When a calling party calls a subscriber using the telephone terminal 102, the calling party is connected to the LMTD 112. The LMTD 112 may output a message to the calling party to hold while the called party (subscriber) is being located and proceeds to transmit an inquiry signal to the subscriber's pager 116, for example.

Unlike a normal page, the inquiry signal does not cause the pager 116 to alert the subscriber but causes the pager 116 to return a response signal to the LMTD 112 through the cell site 118. The pager response signal and any signals added by the cell site 118 is used by the LMTD 112 to determine whether the subscriber is busy or not busy. If busy, the LMTD 112 informs the calling party and offers to take a message, for example. If not-busy, the LMTD 112 pages the subscriber via a normal paging process.

Figure 2:
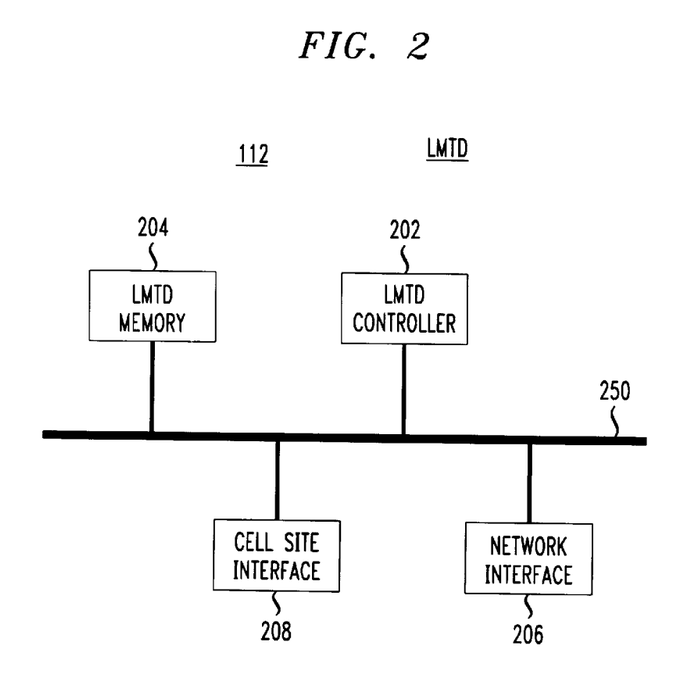
FIG. 2 is a simplified diagram of a portion of the Location-sensitive Mobility Telecommunication Device (LMTD) shown in FIG. 1.

FIG. 2 is a block diagram of the LMTD 112 which includes an LMTD controller 202, an LMTD memory 204, a network interface 206, and a cell site interface 208. All the above components are coupled together through a signal bus 250.

When a calling party calls a subscriber through the telephone terminal 102, the call is routed to the LMTD controller 202 via the network interface 206, for example. While the LMTD controller 202 may communicate with the cell site 118 through either the cell site interface 208 or the network interface 206, in the following discussion the LMTD controller 202 communicates with the cell site 118 only through the cell site interface 208 as an example.

The LMTD controller 202 responds to the call by transmitting the inquiry signal to the pager 116 via the cell site interface 208 and the cell site 118. When the pager 116 responds with a pager response, the cell site 118 relays the contents of the pager response to the LMTD controller 202 in the form of a site response via the cell site interface 208. The LMTD controller 202 determines the status of the subscriber based on either a site response status indication, or by correlating location information in the site response with predetermined subscriber profile information stored in the LMTD memory 204. The subscriber's location may have been determined by any of various methods at the pager itself (for example, global positioning satellite) or, as in the preferred embodiments, the subscriber location is equated with an identification of the primary cell site 118 replying to the LMTD controller 202.

The pager 116 does not issue an alert in response to the inquiry signal, so that the subscriber is not disturbed. If the LMTD controller 202 determines that the subscriber status is NOT-BUSY, then the LMTD controller 202 pages the subscriber via the cell site interface 208 and the pager 116 issues an alert. If the LMTD controller 202 determines that the subscriber status is BUSY, then the LMTD controller 202 does not issue a page that causes the pager 116 to issue an alert, but may take alternative action as described above.

Figure 3:
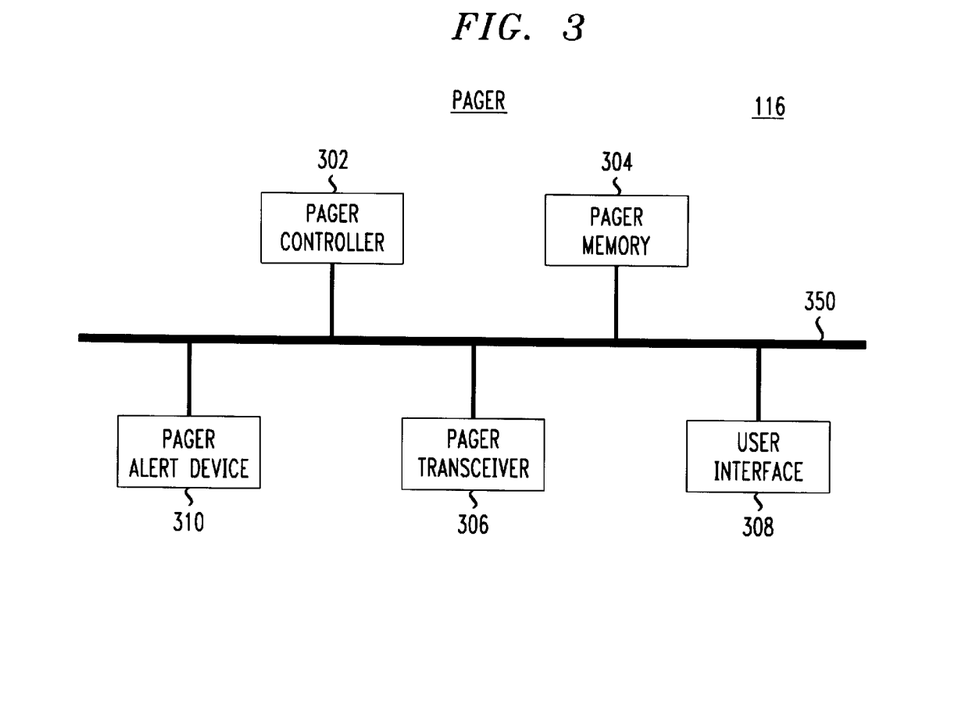
FIG. 3 is a block diagram showing components of a pager.

FIG. 3 is a block diagram of the pager 116 which includes a pager controller 302, a pager memory 304, a pager transceiver 306, a pager user interface 308, and a pager alert device 310. The above pager components are coupled together via a signal bus 350.

An inquiry signal and a page both include a capcode that identifies the intended receiving pager 116. When either the inquiry signal or the page is received, the pager controller 302 matches the received capcode with a capcode stored in the pager memory 304. If the capcodes match, the pager controller 302 then determines whether an inquiry signal or a page has been received.

If an inquiry signal is received, the pager controller 302 responds by transmitting a pager response including its own capcode via the pager transceiver 306. The pager response may also include a pager status indication when the subscriber wants to compel a particular status determination regardless of location. To do so, the subscriber may specify a pager status override via the pager user interface 308 by selecting the position of a switch on the pager 116 for example.

If a page is received, the pager controller 302 alerts the subscriber via the pager alert device 310. The pager controller 302 may also store information in the pager memory 304 regarding the page such as a telephone number of the calling party, a text message from the calling party, the date and/or time of page arrival, or other information. In some embodiments, the pager controller 302 can store information received from a page without alerting the subscriber, or by issuing a non-audio (e.g., vibrating pager) alert.

Figure 4:
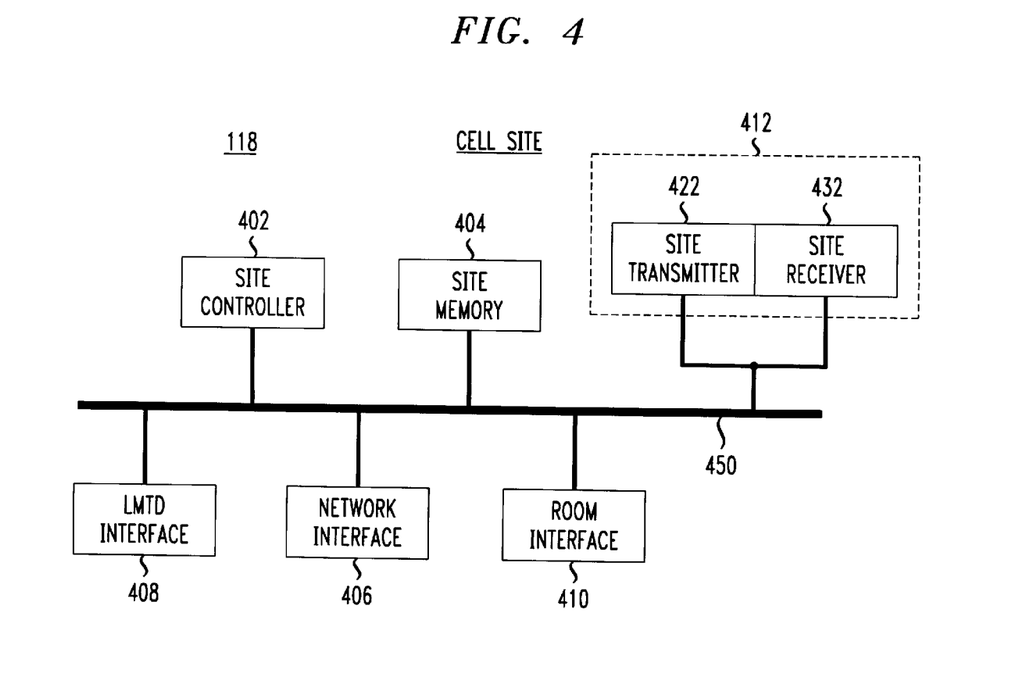
FIG. 4 is a block diagram showing components of a cell site.

FIG. 4 is a block diagram of a cell site 118 which includes a site controller 402, a site memory 404, a network interface 406 or LMTD interface 408 (or both), a room interface 410, and a site transceiver 412 including a site transmitter 422 and a site receiver 432. The above components are coupled together through a signal bus 450. The cell site 118 may communicate with the LMTD 112 through either a network interface 406 via the local exchange carrier (LEC) 108 and (if not a local call) the long distance network 110, or directly via an LMTD interface 408. For ease of discussion, only communication through the LMTD interface 408 is discussed here.

When the LMTD 112 sends a message (i.e., either an inquiry signal or a page) to the pager 116 via the cell site 118, the site controller 402 receives the message via the LMTD interface 408. The site controller 402 forwards the message to the pager 116 via the site transmitter 422 of the site transceiver 412.

When a pager response from the pager 116 is received, the site controller 402 generates a site response based on the pager response and information relating to the cell site 118. The site response includes information from the pager response such as the pager capcode, and cell site data such as information identifying the cell site 118.

Additionally, the site response may include information concerning signal strength of the pager response received at the cell site 118. The various cell sites 118 in the location-sensitive MTS 100 have transmission coverage "envelopes" configured so that usually only one cell site 118 receives the pager response from the pager 116. However, if more than one cell site 118 receive the pager response from the pager 116, the signal strength of the pager 116 at each receiving cell site 118 can be used by the LMTD controller to identify a primary cell site 118. The LMTD controller 202 can determine the location of the subscriber based on the site response from the primary cell site 118.

The site response may include a status override indication due to a pager status override set at the pager 116 and/or a site status override from the site memory 404 or the room interface 410. The site status override may be generated either manually by the subscriber, or automatically. Many alternative ways of setting the subscriber status are possible.

Figure 5:
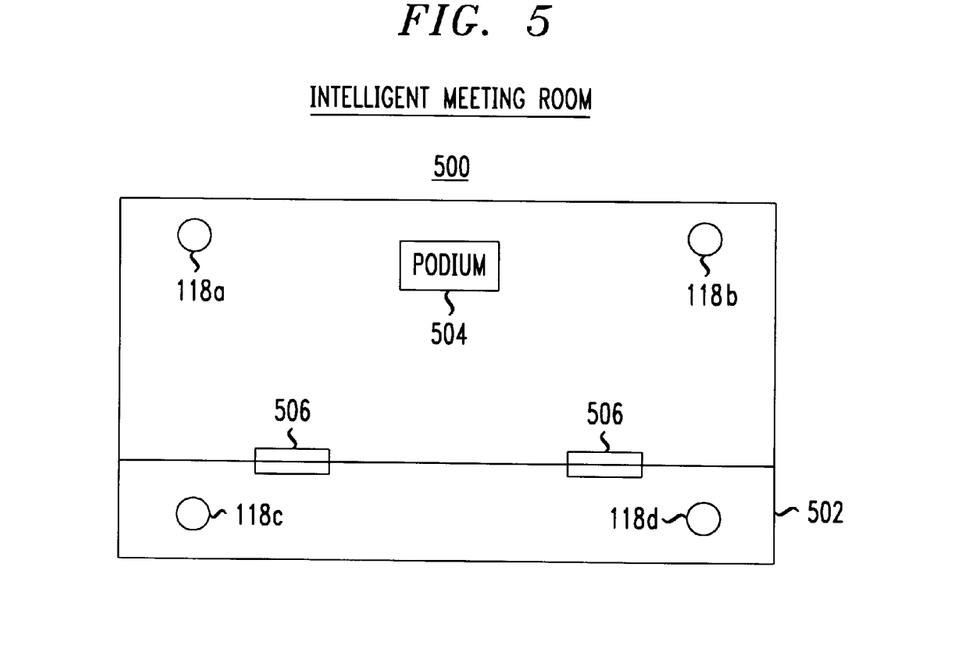
FIG. 5 is a diagram of a location-sensitive "intelligent" meeting room.

For example, FIG. 5 shows an exemplary example of an "intelligent" meeting room 500 for automatic site status override generation. The room 500 includes doors 502 to an adjoining hallway 504, a podium 506, a wall switch 508, and two cell sites 118a and 118b. Likewise, the adjoining hallway 504 contains two cell sites 118c and 118d. The cell sites 118a, 118b, 118c, and 118d transmit and receive signals from all active pagers 116 within each of their respective "envelopes." When the primary cell site is cell site 118a or 118b, the subscriber is assumed to be in the meeting room, and when the primary cell site is cell site 118c or 118d, the subscriber is assumed to be out of the meeting room. Multiple sites may be located within a room 500 as in the example shown, or a single site may suffice.

When out of the room 500, the subscriber's status is assumed to be NOT-BUSY. When in the room 500, the subscriber's status may be preset, or conditioned on other variables including sensors and/or switches in the room 500, so that the subscriber is deemed busy only when one or more of the sensors is activated. For example, 1) the room 500 may be set as an "always busy" room 500 so that the subscriber is deemed BUSY anytime the subscriber is in the room 500; 2) the room 500 may be set as busy only during certain times according to a schedule kept in the site memories 404 of sites 118a and 118b; 3) the room 500 status can be set to BUSY/NOT-BUSY depending on the position of the wall switch 508; and/or 4) the room 500 may be set as BUSY when pressure sensitive plates at the podium 506 register the presence of a speaker.

The site response received by the LMTD controller 202 includes the override information generated by techniques such as discussed above, if any. However, if no override information but only location information is available in the site response, the LMTD controller 202 refers to the subscriber profile 600 in the memory 204 to determine whether the subscriber is to be deemed BUSY or NOT-BUSY. An example of a subscriber schedule profile 600, shown in FIG. 6, defines time and location combinations where a subscriber is to be considered busy. The subscriber schedule profile 600 includes one or more location schedule entries 602 each comprising a time range field 604 and a location field 606 where the subscriber is to be considered busy, and an action field 608 that defines an action to be taken if the subscriber status is BUSY.

Figure 6:
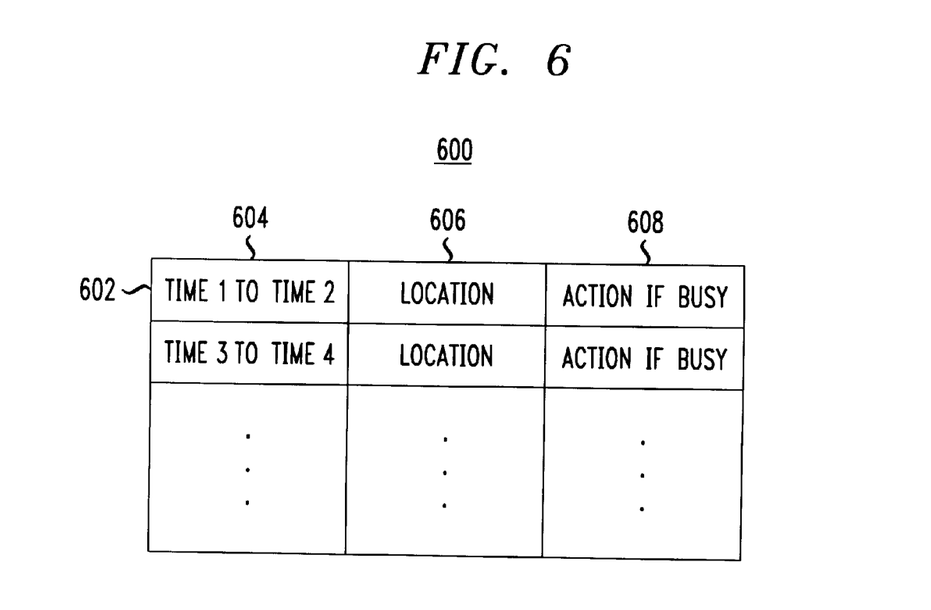
FIG. 6 shows a location-based status check schedule in the LMTD.

The subscriber schedule profile 600 may be shared by a group of subscribers. For example, if a group travels together for a business or sightseeing trip, the entire group could have a common subscriber schedule profile 600 set up for the group before the trip.

When basing busy status on location, the LMTD controller 202 retrieves the subscriber schedule profile 600 for that subscriber from the LMTD memory 204. If the subscriber does not have a subscriber schedule profile 600, the LMTD controller 202 uses a default subscriber schedule profile 600.

The LMTD controller 202 searches the subscriber's schedule profile 600 for a location schedule entry 602 that matches the site response location information and the current time. If a match is found, the LMTD controller 202 determines the subscriber's status to be BUSY, and the predetermined action 608 is taken. However, if no match is found, then the LMTD controller 202 determines the status of the subscriber as NOT-BUSY and issues a page.

In other embodiments, incoming calls or paging requests may be given different priority levels, and the subscriber may assign a busy level threshold to one or more location schedule entry 602 based on time and/or location. When the priority level exceeds the busy level, the subscriber is alerted. Other schedule schemes are possible as well, and will be apparent to one of ordinary skill in the art.

Figure 7:
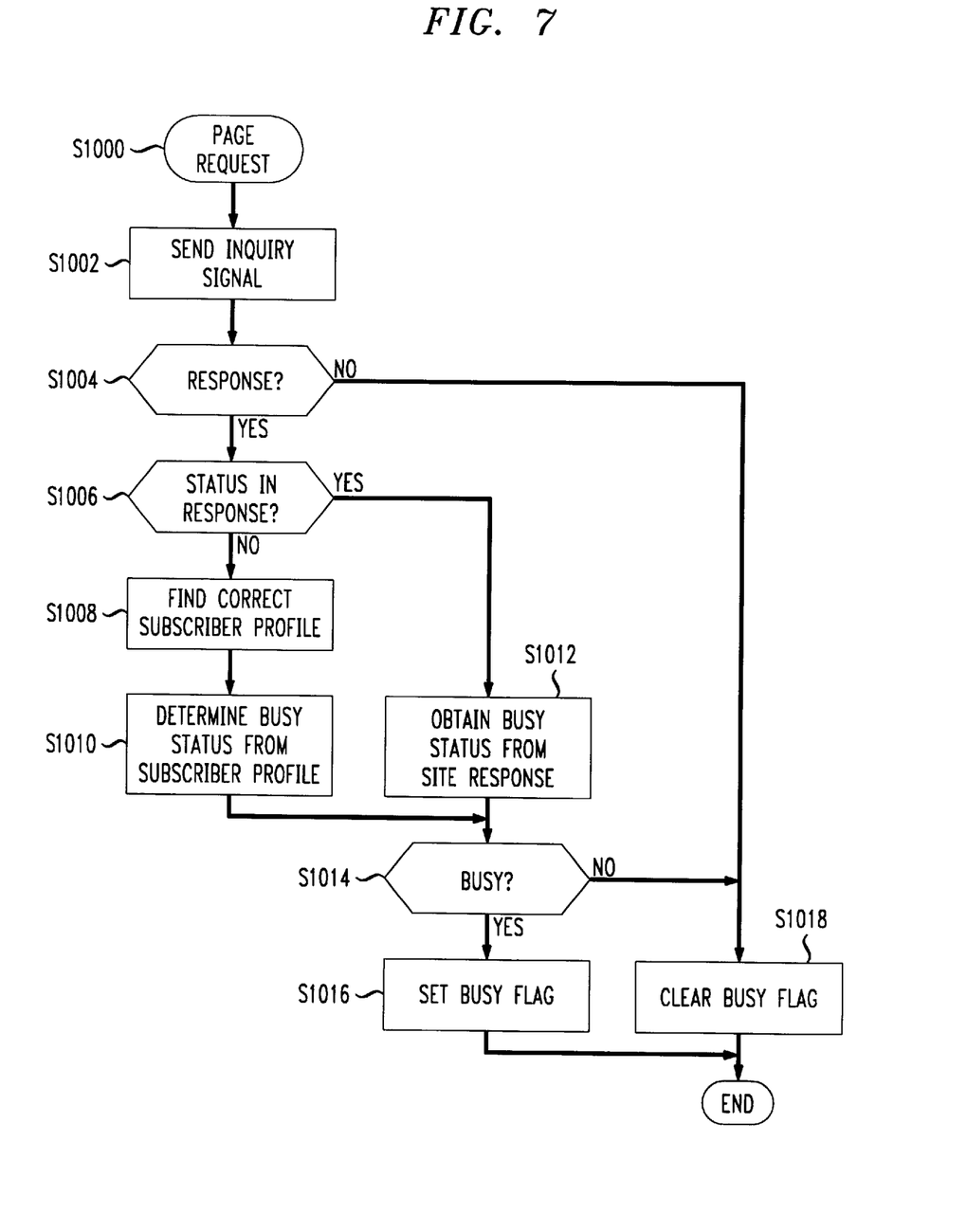
FIG. 7 shows a flowchart for a status determination process performed by an LMTD controller.

FIG. 7 illustrates a status determination process performed by the LMTD controller 202. At step S1000, the LMTD controller 202 receives a paging request from the calling party, and the LMTD controller 202 proceeds to step S1002. At step S1002, the LMTD controller 202 sends an inquiry signal via the cell site interface 208 or network interface 206 to the cell site 118. The LMTD controller 202 waits a predetermined time interval to receive a site response corresponding to the inquiry signal and then proceeds to step S1004.

At step S1004, if no site response was received, the LMTD controller 202 advances to step S1018, clears a BUSY flag in the LMTD memory 204, and the busy-status check is complete. However, if at least one site response from a cell site 118 was received, the LMTD controller 202 proceeds to step S1006. If more than one site response was received, the LMTD controller 202 chooses one of the site responses as a primary cell site, and proceeds to step S1006.

At step S1006, the LMTD controller 202 checks for a site response status indication. A site response status indication can be in the form of a status word that has one value to indicate a status of BUSY, has another value to indicate a status of NOT-BUSY, or is empty to indicate that the subscriber status has not been determined at the site for example.

If there is a site response status indication, the LMTD controller 202 advances to step S1012. At step S1012, the LMTD controller 202 determines the status from the site response status indication, and proceeds to step S1014. If there is no site response status indication at step S1006 (e.g., the status word is empty), the LMTD controller 202 proceeds to step S1008. At step S1008, the LMTD controller 202 locates the correct subscriber profile 600 for that subscriber, and proceeds to step S1010.

At step S1010, the LMTD controller 202 uses the site response location information to determine from the subscriber schedule profile 600 whether the status of the subscriber is BUSY or NOT-BUSY and proceeds to step S1014. At step S1014, the LMTD controller 202 sets the BUSY flag in the LMTD memory 204 at step S1016 if the status is BUSY, or clears the BUSY flag in the LMTD memory 204 at step S1018 if the status is NOT-BUSY. This completes the busy-status check.

If the subscriber status is determined to be NOT-BUSY, the LMTD controller 202 pages the subscriber. The LMTD controller 202 transmits a normal paging message via the cell site 118 to the pager 116, which alerts the subscriber that he has been paged. If the subscriber status is determined to be BUSY, no page alert will be issued.

Figure 8:
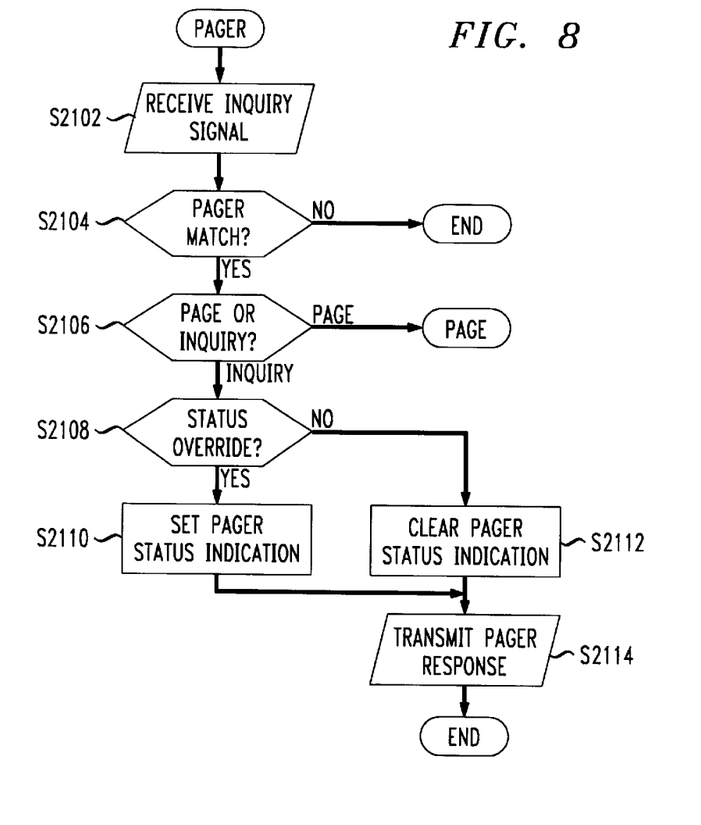
FIG. 8 shows a flowchart for a pager response generating process performed by a pager.

FIG. 8 shows the process performed by the pager 116 for receiving the inquiry signal from the cell site 118. At step S2102, the pager controller 302 receives the inquiry signal via the pager transceiver 306 and proceeds to step S2104. At step S2104, the pager controller 302 determines whether the pager identification included in the inquiry signal matches pager capcode. If there is no match, the pager controller 302 ends the process. If a match is found, the pager controller 302 proceeds to step S2106.

At step S2106, the pager controller 302 determines whether a page or an inquiry signal is received. If a page is received, the pager controller 302 issues an alert and the process ends. If an inquiry signal is received, the pager controller 302 proceeds to step S2108.

At step S2108, the pager controller 302 checks for a pager status override. If a pager status override has been set via the pager user interface 308 for example, the pager controller 302 proceeds to step S2110 and sets the pager status indication to indicate BUSY or NOT-BUSY according to the desired status. If there is no pager status override, the pager controller 302 proceeds to step S2112 and clears the pager status indication. Once the pager status indication has been set or cleared at step S2110 or S2112, the pager controller 302 proceeds to step S2114 and transmits a pager response.

Figure 9:
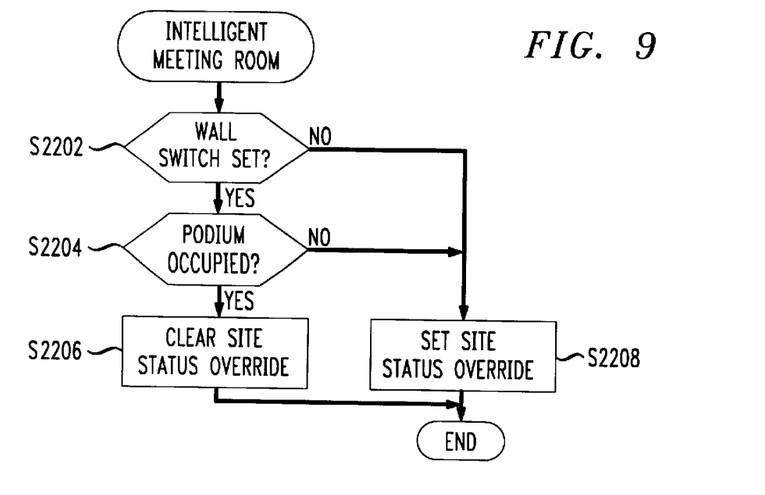
FIG. 9 shows a flowchart for a site status override setting/clearing process performed at a cell site location in an intelligent meeting room.

FIG. 9 shows the process performed in an intelligent meeting room for setting a site status override in the site memory 404. At step S2202, an intelligent meeting room status determination apparatus (MRSDA) determines whether a status-setting wall switch is on. If the wall switch is on, the MRSDA advances to step S2208; otherwise the MRSDA proceeds to step S2204.

At step S2204, the MRSDA determines whether a speaker's podium is occupied. If the podium is occupied, the MRSDA advances to step S2208; otherwise the MRSDA proceeds to step S2206, clears the site status override in the site memory 404 via the room interface 410, and the process ends.

At step S2208, since either the status-setting wall switch is on or the speaker's podium is occupied, the MRSDA sets the site status override in the site memory 404 via the room interface 410, and the process ends.

Figure 10:
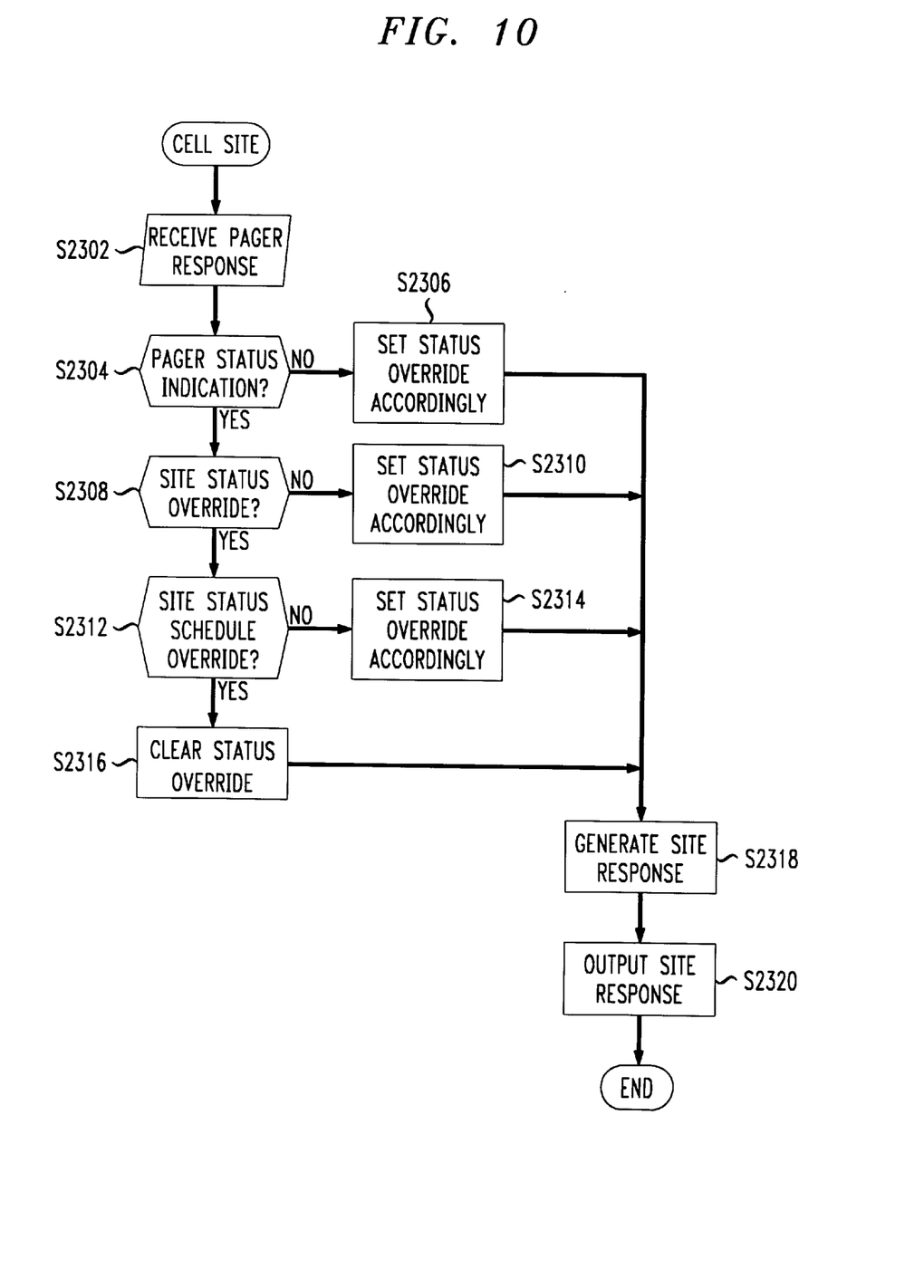
FIG. 10 shows a flowchart for a site response generating process performed by a site controller at a cell site.

FIG. 10 shows the process performed at the cell site 118 after receiving the pager response from the pager 116. At step S2302, the pager response is received at the site controller 402 via the site receiver 432. Then the site controller proceeds to step S2304.

At step S2304, the site controller 402 checks for a pager status indication in the pager response. If there is a pager status indication in the pager response, the site controller 402 proceeds to step S2306, sets a status override indication that reflects the pager status indication, and advances to step S2318. If there is no pager status indication in the pager response, the site controller 402 proceeds to step S2308.

At step S2308, the site controller 402 checks for a site status override in the site memory 404. If there is a site status override in the site memory 404, the site controller 402 proceeds to step S2310, sets a status override indication that reflects the site status override, and advances to step S2318. If there is no site status override in the site memory 404, the site controller 402 proceeds to step S2312.

At step S2312, the site controller 402 checks for a site schedule override. If there is a site override schedule in the site memory 404 that defines a site status for the current time, the site controller 402 proceeds to step S2314, sets a status override indication that reflects the site override schedule, and advances to step S2318. If there is no site schedule override, the site controller 402 proceeds to step S2316.

At step S2316, there being no pager, room, or site schedule override, the site controller 402 proceeds to step S2316, clears the status override indication, and advances to step S2318.

At step S2318, the site controller 402 generates a site response including the pager response data and the status override indication (if any). Then the site controller 402 proceeds to step S2320 and outputs the site response to the LMTD 112 via the network interface 406.

While this invention has been described in conjunction with specific embodiments outlined above, it is evident that many alternatives, modifications and variations will be apparent to those skilled in the art.

For example, in the exemplary embodiment of the invention described above, the location of the subscriber is determined with reference to the identification of the cell cite 118 reporting the pager 116 response. However, in alternative embodiments the pager 116 may be able to determine its own location, by a radio positioning method, for example. In those embodiments that determine location at the pager itself, the pager response received at the cell site 118 would also include location information.

Busy status may be conditioned on the location of a subscriber or subscribers in other ways as well. For example, the LMTD 112 may determine a subscriber's busy status based how many subscribers are at his particular location. The presence of more than a certain number of subscribers, or even two subscribers, in a potential meeting room (for example, in the subscriber's private office) may cause the LMTD 112 to determine that a meeting is taking place and the subscriber should be considered busy.

Accordingly, the preferred embodiments of the invention as set forth herein are intended to be illustrative, not limiting. Various changes may be made without departing from the scope of the invention as defined in the following claims.

What is claimed is:

1. A method for operating a mobility telecommunication system, comprising:

receiving a call from a caller for a subscriber in a location sensitive mobility telecommunication device (LMTD);

obtaining in the LMTD location information of a mobile communication device of the subscriber; and preventing an alert device of the mobile communication device from alerting the subscriber based on information related to the call and the location information of the mobile communication device.

2. The method of claim 1, wherein the obtaining step comprises:

transmitting an inquiry signal to the mobile communication device through at least one cell site; and receiving in the LMTD a site signal from the cell site in response to the inquiry signal, the site signal including the location information of the mobile communication device.

3. The method of claim 2, wherein the location information of the mobile communication device includes a subscriber entered status entered by the subscriber.

4. The method of claim 3, wherein if the subscriber entered status is BUSY, then the mobility telecommunication system prevents the alert device of the mobile communication device from alerting the subscriber by not connecting the call to the mobile communication device, and responds to the call with a return message indicating that the subscriber is busy.

5. The method of claim 3, wherein if the subscriber entered status is NOT-BUSY, then the mobility telecommunication system connects the call to the mobile communication device and the mobility communication device alerts the subscriber.

6. The method of claim 2, wherein the location information of the mobile communication device does not include a subscriber entered status entered by the subscriber.

7. The method of claim 6, further comprising:

identifying a location based on the site signal;

retrieving a subscriber profile from a memory of the LMTD;

searching the subscriber profile for an entry corresponding to the location and time of call included in the information related to the call; and responding to the call based on a status in the entry if found in the searching step.

8. The method of claim 7, wherein the location corresponds to a cell site identification of the cell site that transmitted the site signal.

9. The method of claim 7, wherein if the status is BUSY, then the mobility telecommunication system prevents the alert device of the mobile communication device from alerting the subscriber by not connecting the call to the mobile communication device and responds to the call with a return message indicating that the subscriber is busy.

10. The method of claim 9, further comprising offering features specified in the subscriber profile to the caller.

11. The method of claim 10, wherein the features specified in the subscriber profile include call forwarding and voice mailbox.

12. The method of claim 7, wherein if the status is NOT-BUSY, then the mobility telecommunication system connects the call to the mobile communication device and the mobility communication device alerts the subscriber.

13. The method of claim 2, further comprising:

receiving the inquiry signal in the cell site; and transmitting a site inquiry signal from the cell site.

14. The method of claim 13, further comprising:

receiving the site inquiry signal in the mobile communication device without activating the alert device;

retrieving mobile communication device information from a memory of the mobile communication device; and transmitting the mobile communication device information in response to the site inquiry signal.

15. The method of claim 14, further comprising:

receiving the mobile communication device information;

generating the site signal, the site signal including cell site information and the mobile communication device information; and transmitting the site signal to the LMTD.

16. The method of claim 15, further comprising generating an intelligent room status, wherein the cell site information includes the intelligent room status.

17. The method of claim 16, wherein the intelligent room status is BUSY if one of a podium status is BUSY, a preset status is BUSY, and a number of mobile communication devices that responded to the site inquiry signal exceeds a predetermined number, and the intelligent room status is NOT-BUSY if one of a podium status is NOT-BUSY, a preset status is NOT-BUSY, and a number of mobile communication devices that responded to the site inquiry signal is less than a predetermined number.

18. The method of claim 15, wherein the cell site receives a signal containing the mobile communication device information at a signal magnitude, when multiple cell sites receive a signal containing the same mobile communication device information, the LMTD selects a location of a cell site that has a highest signal magnitude that contains the mobile communication device information.

* * * * *